(12) United States Patent
Le Beulze et al.

(10) Patent No.: US 12,492,348 B2
(45) Date of Patent: Dec. 9, 2025

(54) RECOVERY METHOD OF ORGANIC MOLECULES FROM A COMPLEX MATRIX

(71) Applicants: Université de Pau et des Pays de l'Adour, Pau (FR); CENTRE NATIONAL DE LA RECHERCHE SCIENTIFIQUE, Paris (FR); TotalEnergies OneTech, Courbevoie (FR)

(72) Inventors: Aurélie Le Beulze, Fargues-sant-Hilaire (FR); John-Richard Ordonez-Varela, Pau (FR); Brice Bouyssiere, Pau (FR); Jimmy Castillo, San Antonio de los Altos (VE); Vicmary Vargas, Los Teques (VE)

(73) Assignees: Université de Pau et du Pays de l'Adour, Pau (FR); Centre National de la Recherche Scientifique, Paris (FR); TotalEnergies OneTech, Courbevoie (FR)

( * ) Notice: Subject to any disclaimer, the term of this patent is extended or adjusted under 35 U.S.C. 154(b) by 224 days.

(21) Appl. No.: 18/269,889

(22) PCT Filed: Dec. 28, 2020

(86) PCT No.: PCT/IB2020/001114
§ 371 (c)(1),
(2) Date: Jun. 27, 2023

(87) PCT Pub. No.: WO2022/144562
PCT Pub. Date: Jul. 7, 2022

(65) Prior Publication Data
US 2024/0059982 A1 Feb. 22, 2024

(51) Int. Cl.
*C10G 25/00* (2006.01)
*B01J 20/28* (2006.01)
*B01J 20/34* (2006.01)
*C10G 25/12* (2006.01)

(52) U.S. Cl.
CPC ........ *C10G 25/12* (2013.01); *B01J 20/28016* (2013.01); *B01J 20/28083* (2013.01); *B01J 20/34* (2013.01); *C10G 2300/1014* (2013.01)

(58) Field of Classification Search
CPC ................................ C10G 25/00; C10G 25/12
See application file for complete search history.

(56) References Cited

U.S. PATENT DOCUMENTS

| 2008/0099375 A1 | 5/2008 | Landau et al. |
| 2011/0139687 A1 | 6/2011 | Yeganeh et al. |

OTHER PUBLICATIONS

M. F. Ali et al., Nickel and Vanadyl Porphyrins in Saudi Arabian Crude Oils, 7 Energy & Fuels 179-184 (1993).*
B. Gervet, The Use of Crude Oil in Plastic Making Contributes to Global Warming, Lulea University of Technology (2007).*
M. M. S. Abdullah et al., Green Synthesis of Hydrophobic Magnetite Nanoparticles Coated with Plant Extract and Their Application as Petroleum Oil Spill Collectors, 8 Nanomaterials 855 (2018).*
International Search Report & Written Opinion in PCT/IB2020/001114 dated Sep. 13, 2021—9 pages.
Olajire A. A., et al.: Absorptive desulphurization of model oil by Ag nanoparticles-modified activated carbon prepared from brewers spent grains. Journal of Enviromental Chemical Engineering. vol. 5, No. 1. Feb. 1, 2027. pp. 147-159. (2017).

* cited by examiner

*Primary Examiner* — Randy Boyer
(74) *Attorney, Agent, or Firm* — Tucker Ellis LLP

(57) ABSTRACT

The invention relates to a method for recovering organic molecules (10) from a complex matrix (20) said method (100) comprising the steps of: Providing (110) the complex matrix (20); Contacting (120) the complex matrix (20) with biogenic nanoparticles (30), for an adsorption of the organic molecules (10) on biogenic nanoparticles (30); Separating (140) biogenic nanoparticles enriched (35) with the organic molecules (10) from a depleted complex matrix (22); and Using (150) the organic molecules (10) that were adsorbed to the biogenic nanoparticles (30) in a chemical process or in a chemical device.

17 Claims, 8 Drawing Sheets

RECOVERY METHOD OF ORGANIC MOLECULES FROM A COMPLEX MATRIX

FIELD OF THE INVENTION

The present invention relates to the field of recovery of organic molecules. In particular, the invention relates to the field of the recovery of organic molecules from a complex matrix. This invention provides a new treatment method, organic molecules obtainable by a method according to the invention and a method for use of these organic molecules.

DESCRIPTION OF RELATED ART

Crude oil, pyrolysis oil and bio-oil have been used for the development of the industries and production of several commodities, which are now part of the humanity development. However, mankind needs to do more with fewer resources and the use of these oils need to be optimized.

Crude oils are naturally occurring, unrefined petroleum products composed of hydrocarbon deposits and other organic materials. Pyrolysis oils are present in many applications (recycling, petrochemicals, refineries or biorefineries), and are usually produced by depolymerization and fragmentation of constituents of biomass or plastics through the application of high temperature. Bio-oil can be obtained by hydrothermal liquefaction which is used in order to convert biomass into oil.

These oils are complex matrices and are generally composed of a mixture of complex and less complex molecular structures, some of which cannot be readily identified. Such molecular structures include for example paraffins, naphthenates, asphaltenes, resins, aromatic hydrocarbons, saturates, acids, water, polymers, organic acids, aldehydes and hydroxy aldehydes, ketones and hydroxyketones, alcohols and other compounds depending on oil sources. Because crude oil, pyrolysis oil, and bio-oil are a mixture of such widely varying constituents and varying proportions, their physical properties also vary widely (such as chemical and thermal stability, viscosity, polarity, physicochemical properties, etc.).

Hence, considering this variability and presence of several contaminants which can hinder the use of these oils, there has been for many years an ongoing effort to develop new and improved separation methods of oil components, such as organic molecules, specifically from crude oil, pyrolysis oil or bio-oil. Separations were mainly directed to contaminant causing reductions in oil performances during subsequent uses. In particular, metal porphyrins in oils have a negative effect on catalysts of oil refining processes.

For example, soft process has been proposed, employing selective solvent and soft conditions, to remove metal complexes from heavy oils and to overcome the aggregation of the metals with other components of the asphaltenes. However, additional treatments of oils such as several filtration and concentrations were needed [Yin et al. Energy and fuels, 2009; 23-Separation of petroporphyrins from asphaltenes by chemical modification and selective affinity chromatography].

It has been found that the pre-dissolution of asphaltenes and resins in aromatic solvents such as sulfuric acid allows improving the extraction of porphyrins by means of reducing their association with polycondensed heteroatom structures. Nevertheless, due to the presence of porphyrins having atypical structures and substitutes, efficient separation is not complete, and the composition is greatly altered because of acids which destroy porphyrins (40-80%). [Yakubov et al. Intech. 2017—Chapter 7—Isolation of porphyrins from heavy oil objects].

Many other methods can be cited such as non-catalytic processes (WO2013135973), hydrodeoxygenation step in the presence of a catalyst (U.S. Pat. No. 7,578,927), exposure to hydrogen gas (U.S. Pat. No. 4,795,841), heteropolyacid (WO2019040446), however, in most cases, oils undergo hydrotreatment such as hydrodesulfurization (HDS) or hydrodenitrogenation (HDN) which capture and eliminate organic molecules.

Moreover, these methods have been designed to remove contaminants from a complex matrix and create an enhanced oil mixture, organic molecules were wasted because of treat as contaminants.

Nowadays, there is a need for a solution allowing the recycling of organic molecules removed from a complex matrix in order to maximize the use of compounds available in these oils and thus their value.

SUMMARY OF THE INVENTION

The following sets forth a simplified summary of selected aspects, embodiments and examples of the present invention for the purpose of providing a basic understanding of the invention. However, the summary does not constitute an extensive overview of all the aspects, embodiments and examples of the invention. The sole purpose of the summary is to present selected aspects, embodiments and examples of the invention in a concise form as an introduction to the more detailed description of the aspects, embodiments and examples of the invention that follow the summary.

The invention aims to overcome the disadvantages of the prior art. In particular, the invention proposes a new method for recovering organic molecules from a complex matrix, said method allowing the treatment of a complex matrix, the valuation of organic molecules naturally present in the complex matrix without destroying them, and advantageously the method according to the invention is simple, rapid, not expensive and eco-responsible. The method allows providing organic molecules which may be used in valuable chemical reaction.

Hence, according to an aspect of the present invention, it is provided a method for recovering organic molecules from a complex matrix, said method comprising the steps of:
  Providing the complex matrix,
  Contacting the complex matrix with biogenic nanoparticles, for an adsorption of organic molecules on biogenic nanoparticles,
  Separating biogenic nanoparticles enriched with the organic molecules from a depleted complex matrix, and
  Using the organic molecules that were adsorbed to the biogenic nanoparticles in a chemical process or in a chemical device.

Currently no attention is paid to organic molecules in purification and filtration processes, they are treated as waste and contaminants and therefore they are not recovered, they can even be thrown away or burned. Thanks to the method according to the invention the organic molecules are recycled and valued. Moreover, the method allows the valuation of these organic molecules and their use in other applications as a catalyst or reactant or component to be transformed. Hence, the method does not only allow the separation of organic molecules but their recovery and their reuse.

The method allows recovering organic molecules which were usually destroyed by the treatment of the oil because considered as wastes. The method according to the invention allows increasing the accessibility and availability of organic molecules. The method is eco-responsible particularly because in some embodiments it needs less or no solvents, dispersants, extractant chemical synthesis or extraction method usually done.

The method overcomes the difficulties related to the particularities of constituents, proportions and physical properties and it may be used with different matrices such as a complex matrix.

According to other optional features of the organic molecules' recovery method, said method may comprise one or several following features alone or in combination:

the organic molecules are used after a step of desorption from the biogenic nanoparticles. This allows reusing the biogenic nanoparticles depleted and to recover organic molecules, promoting the eco-responsibility of the method and its inexpensiveness; moreover, it allows an easier usability, the organic molecules are used being adsorbed to the biogenic nanoparticles. This further reduce the steps needed to use the organic molecules;

the step of contacting the complex matrix with biogenic nanoparticles comprises at least one of: filtration, spinning, centrifugation, stirring, ultrasound treatment, magnetic contact, microwave treatment, and heating. This step improves the contact between the organic molecules from the complex matrix with the biogenic nanoparticles, in order to recover organic molecules;

the step of contacting comprises contacting the complex matrix with a nanofluid, said nanofluid comprising biogenic nanoparticles and a low polarity solvent. This alternative may be considered when the complex matrix is viscous; and the nanofluid is advantageously used in viscous matrix;

the step of separating biogenic nanoparticles comprises at least one of: filtration, settling, centrifugation, magnetic separation, and vacuum filtration. These particular separation steps can be easily scaled-up.

the method comprises a step of regenerating the biogenic nanoparticles depleted from organic molecules. The method is thus eco-responsive, with the reuse of biogenic nanoparticles and the recycling of organic molecules;

organic molecules are selected from: non-metallic organic molecules, organometallic molecules, aggregate of non-metallic organic molecules and/or organometallic molecules, or their salts;

the organic molecules comprise porphyrins; Preferably, the step of using the organic molecules includes a $CO_2$ reduction in presence of porphyrins in order to produce methane or other molecules;

the complex matrix is selected from crude oil, plastic oil, wood oil, bio-oil, algae oil. Preferably, the complex matrix is an algae oil.

the biogenic nanoparticles are doped, functionalized and/or raw. Preferably, biogenic nanoparticles are doped and/or functionalized. Alternatively, biogenic nanoparticles are raw.

the biogenic nanoparticles are mesoporous.

the step of contacting the complex matrix with biogenic nanoparticles comprises the use of depleted biogenic nanoparticles. Biogenic nanoparticles may be recycled and reused.

the step of using the organic molecules is selected from gas separation, waste treatment, biomethane application, plastic recycling, complex matrix recycling, complex matrix purification, complex matrix extraction, civil engineering, plastic manufacture, polymer manufacture, or sensor manufacture.

According to another aspect of the present invention, it is provided for the use of organic molecules obtainable by the method according to the invention for their application in gas separation, waste treatment, biomethane application, plastic recycling, complex matrix recycling, complex matrix purification, complex matrix extraction, civil engineering, plastic manufacture, polymer manufacture, or sensor manufacture.

The use is eco-responsive and non-expensive. No chemical synthesis is needed in order to do one of these applications. The use of these organic molecules allows providing green resources. Moreover, such organic molecules can be used adsorbed to the biogenic nanoparticles.

Moreover, according to another aspect of the present invention, it is provided recovered organic molecules from a complex matrix through a method according to the invention for use in chemical reaction. Recovered organic molecules allow preventing the degradation of catalysts and to recycle them rather than throwing or burning or treating as contaminants. Moreover, the recovered organic molecules allow to decrease the cost of a chemical reaction or chemical application.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION

Figure 1:
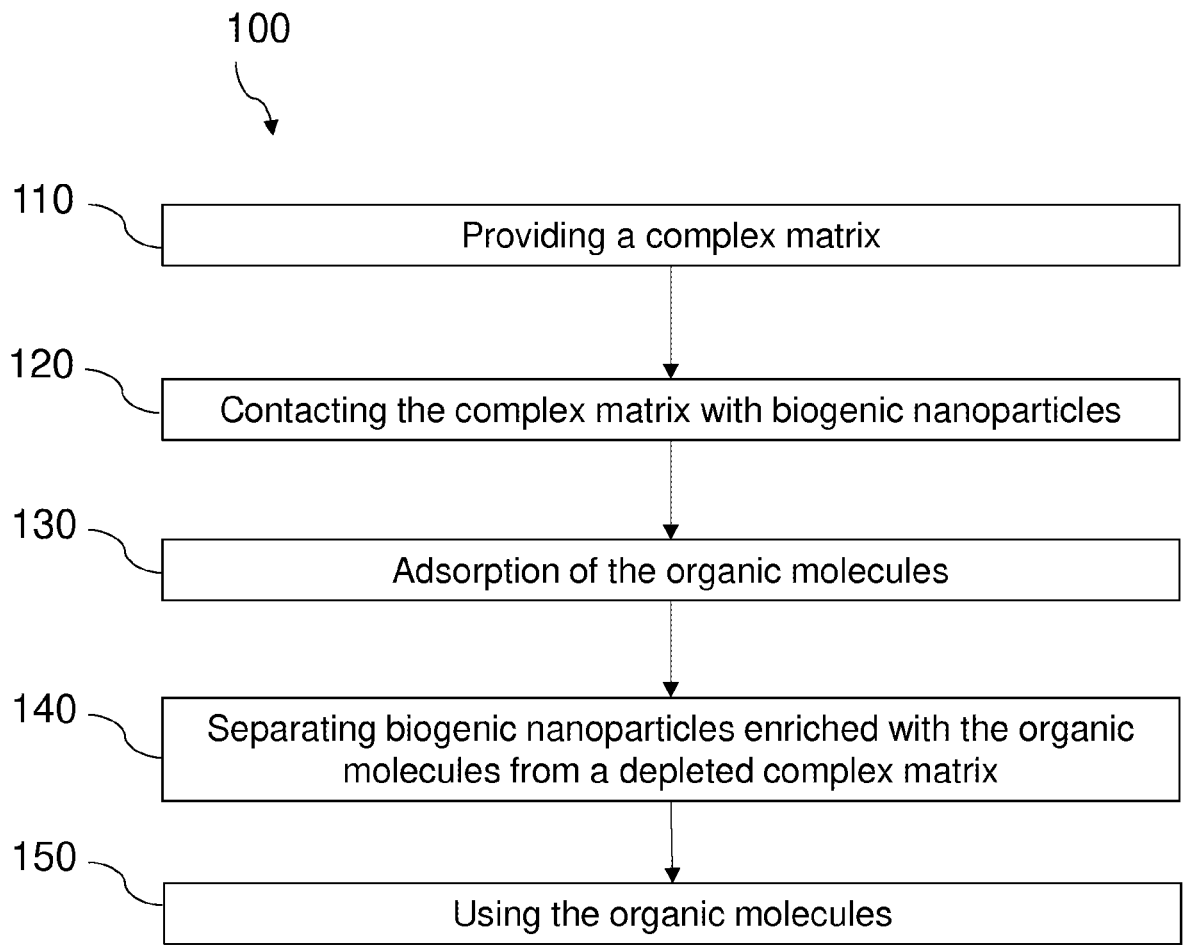
FIG. 1 is a schematic view of a method for recovering organic molecules according to an embodiment of the present invention.

A description of example embodiments of the invention follows.

As used herein, "nanoparticles" are particles between 1 and 150 nanometers (nm) in size, preferably 100 nm or less, as D50 value measured by a single particle analysis, with all three external dimensions inferior to 150 nanometers, preferably less than 100 nm, and more preferably whose longest and shortest axes do not differ significantly, with a significant difference typically being a factor of at least 3. D50 value being estimated through SEM (electronic microscopy) and/or DLS (Dynamic Light Scattering). Preferably, D50 value is estimated though Dynamic Light Scattering.

As used herein, a "biogenic nanoparticles" are generally made from agricultural wastes containing fiber. For example, rice husk is the coating on a seed or grain of rice.

The term "solvent" as used herein refers to a liquid that can dissolve a solid, liquid, or gas. Nonlimiting examples of solvents are silicones, organic compounds, water, alcohols, ionic liquids, and supercritical fluids.

The term "recycling" as used herein refers to an operation in order to use organic molecules, and which allows to the extracted organic molecules to be reintroduced into the production of new or other products or process.

The term "recovery" as used herein refers to the notion of capture and the notion of reuse organic molecules. The term recovery or recover may correspond according to the context to the recuperation and the valuation, upgrading, revaluation of organic molecules.

As used herein "organic molecules" refer to compound present in a complex matrix and which have an interest in chemical application, gas application, petroleum and petrochemical application. Organic molecules comprise organometallic molecules and non-metallic organic molecules (containing for example oxygen, nitrogen and/or halogen atoms), aggregate of non-metallic organic molecules and/or organometallic molecules, or their salts. Organic molecules can be associated with non-organic molecules such as metallic salts, for example from lithium.

As used herein "complex matrix" refers to a composition comprising oil(s) or oil(s) and water, not necessarily in the form of an emulsion, and many other components. Oil(s) in complex matrix may correspond to an oil being heat treated such pyrolysis treatment or hydrothermal liquefaction treatment or not. For example, oil(s) in complex matrix may correspond to crude oil or pyrolysis oil or bio-oil.

As used herein "heat treatment" refers to a temperature comprise between 200° C. to 1000° C.

As used herein "pyrolysis oil" designates an oil obtained from the pyrolysis or hydrothermal liquefaction of, for example, agricultural wastes, such as the stalks of wheat or corn, grass, wood, wood shavings, virgin wood (i.e. from forestry or wood processing), agricultural residues, animal waste, grapes, and sugar cane, may also be obtained from the pyrolysis of plastic or rubber or fossil fuels, industrial waste, domestic waste, but also from algae.

The expression "hydrothermal liquefaction", herein refers to algae oil, although the algae oil is obtainable by hydrothermal liquefaction, herein by easier comprehension, pyrolysis oils incorporate all the oil from biomass or petroleum after a step of heat. Oil can be extracted from biomass by hydrothermal liquefaction in a reactor at a temperature of about 200° C. to 700° C. with subsequent cooling. Usually temperatures of about 250° C. to 520° C. yield most liquid.

The term "biomass or biomass material" refers preferably to plant biomass that is composed of cellulose and hemicellulose, and lignin. Biomass comes in many different forms, which may be grouped into four main categories: wood and wood residues, including sawmill and paper mill discards, municipal paper waste, agricultural residues, including corn stover (stalks and straw) and sugarcane bagasse, and dedicated energy crops, which are mostly composed of tall, woody grasses. It may also refer to living organisms capable of oxygen photosynthesis whose life cycle generally takes place in an aquatic environment as algae such as *Scenedesmus* sp., Parachlorella, *Chlorella* sp. and *Chlamydomonas reinhardtii*. It may also refer to microorganisms as Bacteria and/or Yeast.

The expression "crude oil" herein refers to liquid petroleum that is found accumulated in various porous rock formations in Earth's crust and is extracted for burning as fuel or for processing into chemical products.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99% or more.

As mentioned, current methods in the complex matrix treatment cause degradation or destruction of organic molecules which are treated as contaminants or wastes. Moreover, current methods are not eco-responsive particularly because in some embodiments it needs solvents, dispersants, extractant, or a chemical synthesis or extraction method usually done. In addition, some of these wasted organic molecules are produced for other applications by chemical synthesis, which is expensive, complex and difficult.

Furthermore, other difficulties appear related to the variability of the composition and proportion unknown in a complex matrix.

A method has been developed for increasing the accessibility and availability of organic molecules allowing the valuation of these organic molecules and their use in other applications.

The method overcome the difficulties related to the particularities of constituents, proportions and physical properties and it may be used with different complex matrices.

The method does not only allow the separation of organic molecules but their recovery and their reuse.

In addition, the method includes the use of the organic molecules which are recovered. Advantageously, the method also allows to prevent the degradation of devices in subsequent treatment (like refineries, catalysts . . . ) and increase the oil performances during subsequent uses.

Indeed, the method has developed nanoparticles of biogenic material which adsorb organic molecules to form a stable formation with organic molecules. Moreover, as exposed in examples, it has been found that these biogenic nanoparticles prevent precipitation and destruction of organic molecules and promote their adsorption on biogenic nanoparticles, allowing their recovery and valuation.

Hence, a method according to the invention helps to recover and use organic molecules removed from a complex matrix in order to maximize the use of compounds available in these oils.

According to a first aspect, the invention relates to a method for recovering 100 organic molecules 10 from a complex matrix 20.

As shown in FIG. 1, said method comprising the steps of: providing 110 the complex matrix 20, contacting 120 the complex matrix 20 with biogenic nanoparticles 30, separating 140 the enriched biogenic nanoparticles 35, and using 150 the adsorbed organic molecules 10.

Indeed, as shown in the FIG. 1, said method for recovering 100 organic molecules 10 from a complex matrix 20, comprises a step of providing 110 the complex matrix 20.

As explain, the complex matrix 20 represents a fluid, of generally not fully known composition. Alternatively, the complex matrix may be a suspension. The complex matrix may comprise oil(s) or oil(s) and eventually water, not necessarily in the form of an emulsion in different proportions according to the used oil. For example, oil(s) may be crude oil, pyrolysis oil or bio-oil and the complex matrix can comprise paraffins, naphthenates, asphaltenes, resins, aromatic hydrocarbons, saturates, acids, water, polymers, organic acids, aldehydes and hydroxyaldehydes, ketones and hydroxyketones, alcohols and other compounds depending on oil sources. Preferably the complex matrix comprises at least three of the compounds listed above.

As explained, complex matrix 20 according to the invention comprises oil(s) preferably oils being heat treated. The heat treatment may be pyrolysis or hydrothermal liquefaction or any heat treatment where the temperature is higher than 200° C.

Preferentially, complex matrix comprises oils from petroleum; plastic, biomass or agricultural wastes, such as the stalks of wheat or corn, grass, wood, wood shavings, virgin wood (i.e. from forestry or wood processing), agricultural residues, animal waste, grapes, and sugar cane, may also be obtained from the pyrolysis of plastic or rubber or fossil fuels, industrial waste, domestic waste, but also from algae. Preferably, complex matrix is selected from crude oil, plastic oil, wood oil, bio-oil, algae oil.

The complex matrix may be provided either after the heat treatment (pyrolysis or hydrothermal liquefaction) or before a refinery treatment or a bio-refinery treatment.

The method for recovering organic molecules may comprise a step of contacting 120 the complex matrix 20 with biogenic nanoparticles 30. The contact allows the biogenic nanoparticles to adsorb organic molecules.

The biogenic nanoparticles 30 can adsorb organic molecules and form a stable formation. Moreover, the use of biogenic nanoparticles can prevent organic molecules from precipitating and promote their adsorption on biogenic nanoparticles.

The biogenic nanoparticles 30 may be made from various biogenic materials such as: rice husks, bamboo leaves, corn husks, peat moss, agricultural wastes, straw, hay, sawdust, feathers, vegetable fibers, banana peels, palm fibers, ground corncobs, cotton, jute, feathers, lignin, bagasse, or corn stalk. Preferably the biogenic nanoparticles are made from rice husks, bamboo leaves or corn husks; more preferably the biogenic nanoparticles are made from rice husks. Indeed, rice husks contain more than 15% of silicon that grown naturally as amorphous nanoparticles of $SiO_2$ linked by cellulose, lignin and other organic molecules.

A biogenic nanoparticles preparation according to the invention can comprise a step of washing the biogenic material and a step of treating biogenic material with an acid, preferably a strong acid. This step is in particular designed to remove metal impurities and it raises the number of active sites available for its application on the field.

In particular, the step of treating biogenic material with acid comprises the suspension of the biogenic material in an aqueous solution comprising at least 5%, preferably at least 10% of an acid, more preferably at least 15% of an acid and even more preferably at least 25% of an acid.

Such a treatment can be conducted for at least one hour, preferably at least 6 hours, more preferably at least 12 hours and it can for example be comprised between 6 hours and 30 hours.

The step of treating biogenic material with an acid can be conducted at ambient temperature. Preferably, the step of treating biogenic material with an acid is conducted at a temperature comprised between 5° C. and 40° C.

An acid can be selected from any acidic compound. Preferably, the acid is selected from: hydrochloric acid, hydrobromic acid, phosphoric acid, sulfuric acid, perchloric acid, hydroiodic acid, nitric acid or mixture thereof.

More preferably, the acid is selected from: hydrochloric acid, phosphoric acid and acetic acid or mixture thereof.

A biogenic nanoparticle preparation method according to the invention can comprise a step of drying the treated biogenic material. This step is in particular designed to prepare the treated biogenic material for the next steps.

The biogenic nanoparticle preparation method according to the invention can comprise a step of heating the treated biogenic material at a first temperature comprised between 150° C. and 500° C. This step is in particular designed to remove organic matter.

This step can be implemented in a high-temperature furnace with electric or gas heating.

The step of heating the treated biogenic material can be conducted at a temperature of at least 150° C., preferably at least 200° C. and more preferably at least 350° C. but below 500° C. Even more preferably, the step of heating the treated biogenic material is conducted at about 350° C.

The duration of the step of heating will be highly dependent on the temperature used and the quantity of biogenic material. It can be comprised between 1 hour and 5 hours.

The biogenic nanoparticle preparation method according to the invention comprises a step of heating the treated biogenic material at a second temperature above 600° C. This step is in particular designed to pyrolyze the treated biogenic material. After this step, carbon has been vaporized and only remain nanostructured pure silica.

The duration of the step of heating will be highly dependent on the temperature used and the quantity of biogenic material. It can be comprised between 1 hour and 5 hours.

The step of heating can be followed by a step of removing the ash produced.

The biogenic nanoparticle preparation method according to the invention comprises a step of grinding the pyrolyzed biogenic material to obtain nanoparticles of biogenic material.

This step is in particular designed to produce biogenic material nanoparticles. It is preferably performed after the pyrolyze step.

This step can be implemented with a ball mill like a planetary ball mill or a high-speed beads mill, a rod mill, using ceramic cylinders to hit and break the mass of silica ash.

The duration of the step of grinding will be highly dependent on the grinder used and the setting of said grinder. Typically, it can be comprised between 5 minutes and 4 hours under conditions of at least 150 rpm (for "round per minute"). Preferably, the duration of the step of grinding is higher than 2 hours, more preferably higher than 3 hours.

The step of grinding the pyrolyzed biogenic material allows the production of biogenic material nanoparticles, in particular nanoparticles of pyrolyzed biogenic material. Such nanoparticles preferably have a size distribution comprised between 20 nm and 100 nm (for nanometer).

Preferably, the biogenic nanoparticles are used as solid powder.

However, the biogenic nanoparticles can also be used in the form of a nanofluid such as a suspension of nanoparticles of biogenic material in an organic solvent, preferably the organic solvent comprises a low polarity solvent.

The nanofluid preparation method according to the invention comprises a step of mixing nanoparticles of biogenic material with organic solvents to form a nanofluid. This step is in particular designed to put the nanoparticles in optimal conditions for their use with a complex matrix.

The organic solvent may be selected from: diesel, kerosene, hexane, xylene, toluene or a mixture thereof. Other organic solvents may be elected provided they are compatible with the use of the complex matrix.

Inventors have shown that in the absence of a low polarity solvent, asphaltene will at least partially precipitate in contact with the nanofluid instead of being adsorbed to the nanoparticles. Hence, preferably, the nanofluid comprises a low polarity solvent.

A low polarity solvent according to the invention ca be selected from the list consisting in: acetone, kerosene, hexane, xylene, toluene, dimethylbenzene (such as 1,2-dimethylbenzene, 1,3-Dimethylbenzene, 1,4-dimethylbenzene), mesitylene, benzene, and ethylbenzene.

The organic solvent can comprise at least 10% by mass of a low polarity solvent, preferably at least 20%, more preferably at least 30%.

More preferably, the organic solvent is a mixture of at least two solvent. For example, the organic solvent is a mixture of diesel and xylene.

Preferably, a nanofluid according to the invention comprises at least 0.01% by mass of nanoparticles of biogenic material, more preferably at least 0.05% and even more preferably at least 0.1%.

For example, a nanofluid according to the invention comprises from 0.01% to 1% (limits excluded) by mass of nanoparticles of biogenic material, preferably a nanofluid according to the invention comprises from 0.1% to 0.6% (limits included) by mass of nanoparticles of biogenic material, and more preferably a nanofluid according to the invention comprises from 0.1% to 0.5% (limits included) by mass of nanoparticles of biogenic material.

A nanofluid according to the invention can be substantially constituted of an organic solvent and nanoparticles of biogenic material according to the invention.

The biogenic nanoparticle preparation method according to the invention can comprise a step of functionalizing the nanoparticles of biogenic material.

This step is in particular designed to coat or graft the nanoparticles of biogenic material in order to modify their surface properties. This step may include filing the pores of the nanoparticles. For example, modified nanoparticles can attach to polar or non-polar compounds and they can form a net trapping. This step may also allow targeting organic molecules or increase the contact between organic molecules and biogenic nanoparticles.

The functionalized nanoparticles may be made from any suitable material. Non-limiting examples of suitable surface functionalized nanoparticle materials include metals, metal oxides, polymers, and resins (e.g., silicone resin).

In preferred embodiments, functionalizing nanoparticles of biogenic material comprise doping the nanoparticles with metals or metal-oxides and surface modification of nanoparticles with polymers.

More preferably, functionalized nanoparticles of biogenic material are grafted with Carboxymethyl Cellulose or Polyethylene Glycol. Indeed, those polymers are biocompatible and biodegradable.

Such nanoparticles preferably exhibit a porosity of at least 70%, more preferably at least 75%, even more preferably at least 80%. Porosity is for example determined according to the method of gas saturation, water saturation or mercury saturation. Preferably, porosity is determined according to an adaptation of a method of water saturation described in "Suggested methods for determining water content, porosity, density, absorption and related properties and swelling and slake-durability index properties", International Journal of Rock Mechanics and Mining Science, 16, 2; Pergamon Press, Incorporated.

Moreover, nanoparticles according to the invention can present a pore volume of at least 0.2 $cm^3/g$ (for cubic centimeter per gram), more preferably at least 0.3 $cm^3/g$, even more preferably at least 0.40 $cm^3/g$. Pore volume is for example calculated with data from porosity and density.

In other words, biogenic nanoparticles are mesoporous rather than microporous.

The pore size of biogenic nanoparticles according to the invention is larger than the pore size of microporous nanoparticles, which allow an increase of the separation and of the capture of organic molecules. This enhances the capture organic molecules that cannot be captured with microporous materials.

Preferably, biogenic nanoparticles are used as such. The biogenic nanoparticles may be used raw, or alternatively, both raw and functionalized.

The step of contacting 120 may comprise a contact time that may be variable.

For example, the contact time can be equal to the flow time of the complex matrix through the biogenic nanoparticles (from a few seconds to a few hours).

The contact time may also be increased in order to improve the adsorption of organic molecules on biogenic nanoparticles, for example by stirring.

According to one embodiment, the step of contacting the complex matrix with biogenic nanoparticles may comprise the use of depleted biogenic nanoparticles. These depleted biogenic nanoparticles are described hereinafter. Advantageously, the depleted biogenic nanoparticles may be used alone or in a mixture with biogenic nanoparticles.

The step of contacting 120 the complex matrix 20 with biogenic nanoparticles 30 may comprise at least one of: filtration, spinning, centrifugation, stirring, ultrasound treatment, magnetic contact, microwave treatment, and heating.

Advantageously, this step may be implemented directly in the factory using oil or oil treatment. Moreover, the recovery of the organic molecules before a refinery treatment or a bio-refinery treatment prevent damage of the equipment.

Figure 3:
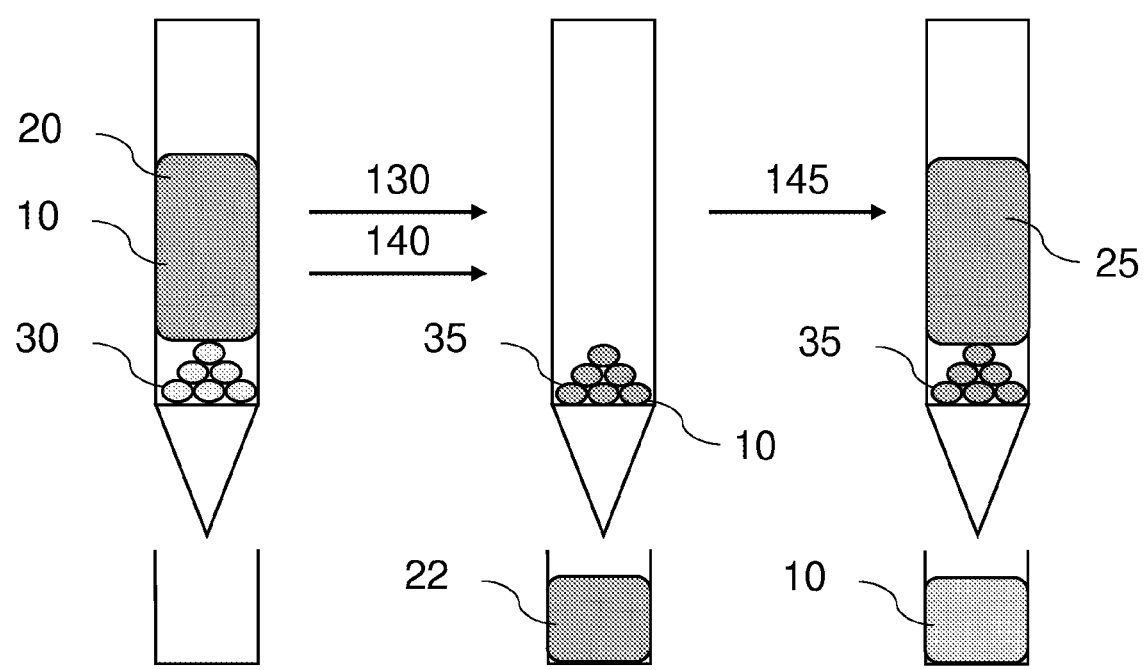
FIG. 3 is a schematic view of a method for recovering organic molecules according to another embodiment of the present invention.

As explained, the step of contacting allows adsorption 130 of the organic molecules 10 on the biogenic nanoparticles 30 as illustrated in FIG. 3.

Organic molecules may be selected from: non-metallic organic molecules, organometallic molecules, aggregate of non-metallic organic molecules and/or organometallic molecules, or their salts.

Organic molecules may comprise O, S, P, Fe, Na, CI, Ni, V, Mg, Cu, N, aromatic group, heteroatoms, halogen atoms, or other metals.

The biogenic nanoparticles can adsorb organic molecules and produces biogenic nanoparticles enriched 35 with organic molecules 10. Moreover, the nanoparticles disperse homogeneously in the complex matrix and thus, the use of surfactants is not necessary. The complex matrix is advantageously a complex matrix depleted 22 from organic molecules, at least from a portion of the organic molecules.

Preferably, the adsorption is made at room temperature. Nevertheless, the complex matrix is preferably a fluidic solution. A fluidic solution may be gaseous or liquid. Preferably, the complex matrix is in a liquid condition in order to promote the flow of the complex matrix through the biogenic nanoparticles.

The temperature may be selected according to the complex matrix, heavy oil will be in a liquid state at temperature above room temperature. Thus, the temperature may be selected according to the complex matrix, but also according to organic molecules. Indeed, a high temperature may destroy some of the organic molecules.

Alternatively, when the complex matrix is a gaseous solution, the temperature may be modulated according to the pressure.

In another way, the temperature may be selected according to the viscosity and density of the complex matrix. For example, depending on the complex matrix, the temperature may be selected between 15° C. and 500° C.

Preferably, each step of the method according to the invention is carried out room temperature. No thermal treatment is needed, the organic molecules are not destroyed, and no residue or ash is produced.

As explained, the biogenic nanoparticles are preferably mesoporous. The adsorption capacity depends of the size pore of biogenic nanoparticles.

The method for recovering organic molecules may comprise a step of separating 140 biogenic nanoparticles enriched 35 with the organic molecules 10 from a depleted complex matrix 22 as illustrated in FIG. 3.

The step of separating biogenic nanoparticles may comprise filtration, settling, centrifugation, magnetic separation and/or vacuum filtration.

For example, when biogenic nanoparticles are functionalized, the magnetic separation comprises a magnet which allows recovering the enriched biogenic nanoparticles with organic molecule, which facilitates the separation of the biogenic nanoparticles from the complex matrix and improve the separation.

The method for recovering organic molecules may comprise a step of using 150 organic molecules 10 that were adsorbed to the biogenic nanoparticles 30 by using them in a chemical process or in a chemical device.

A chemical process may comprise the use of the organic molecules as catalyst or as molecules to be transformed.

A chemical device may comprise sensors, detectors, receptors, amplifiers, analyzers, methanation units, and/or batteries.

The organic molecules may be used in chemical application, gas application, petroleum and petrochemical application such as: gas separation, waste treatment, biomethane applications, plastic recycling, complex matrix recycling, complex matrix purification, complex matrix extraction, civil engineering, plastic manufactures, polymer manufactures, or sensor manufactures.

In particular, the valuable organic molecules that can be used in a method according to the invention can be one or several porphyrins. For example, porphyrins may be used in a methanation.

According to one embodiment, the organic molecules may be used being adsorbed to the biogenic nanoparticles.

Alternatively, the organic molecules may be used in a solution being desorbed from the biogenic nanoparticles.

Figure 2:
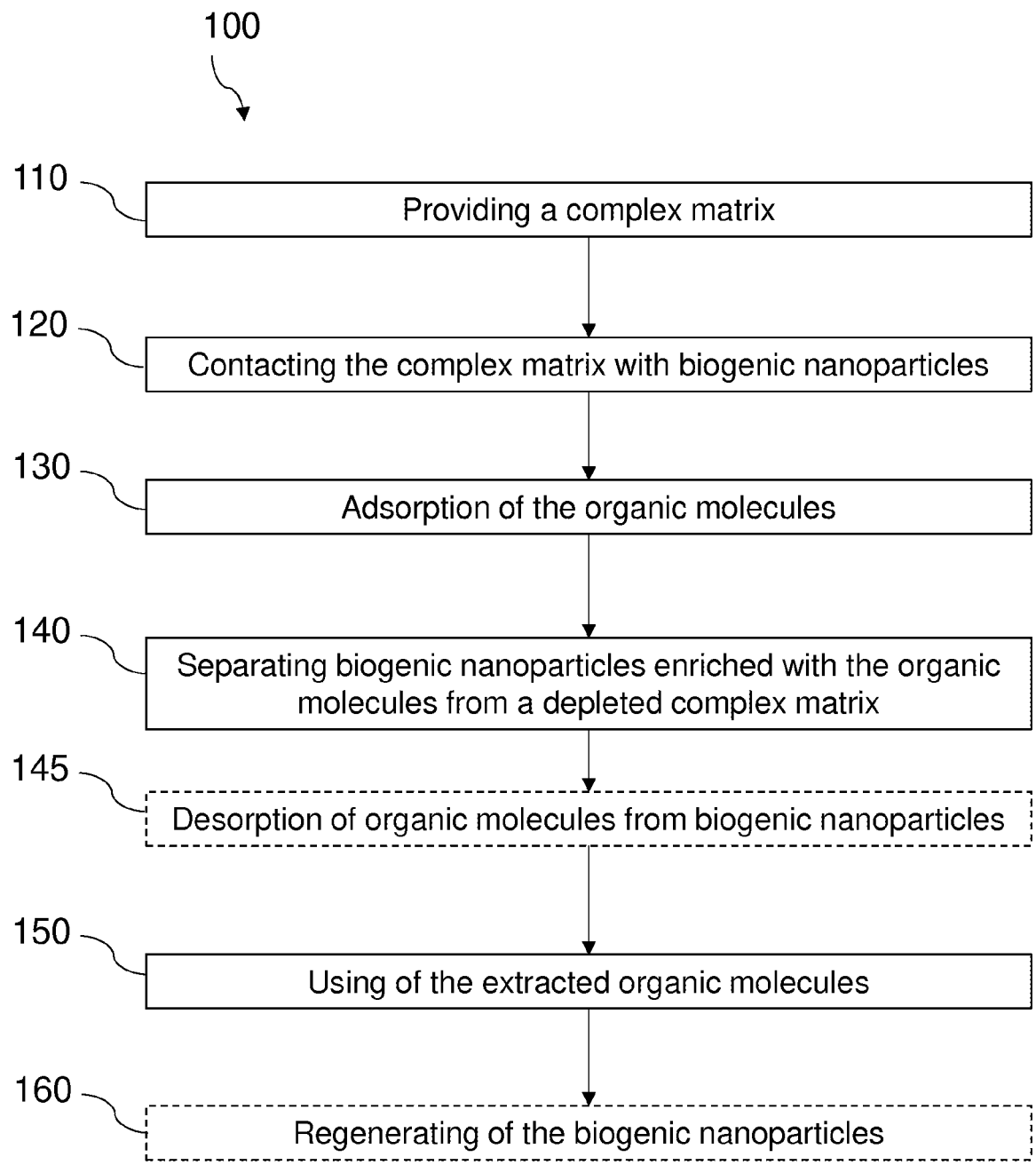
FIG. 2 is a schematic view of a method for recovering organic molecules according to another embodiment of the present invention.

Hence, optionally, as illustrated FIGS. 2 and 3, the method for recovering organic molecules 100 according to the invention may use the organic molecules after a step of desorption 145 from the biogenic nanoparticles.

The desorption also allows recovering biogenic nanoparticles and organic molecules. The recovery of biogenic nanoparticles allows reusing them in the same method or in other way method. For example, biogenic nanoparticles may be used in a heat treatment in order to assure a complete desorption of organic molecules. The clean biogenic nanoparticles may be used in other valuation method or other applications with biogenic nanoparticles.

The cleaning of biogenic nanoparticles may be selected from heat treatment, acid treatment, organic solvent 25.

This step of desorption may also be allowed to increase the recovery of organic molecules.

Thus, advantageously, the method for recovering organic molecules according to the invention may comprise a step of regenerating 160 biogenic nanoparticles depleted from organic molecules as illustrated in FIG. 2. This step allows recovering biogenic nanoparticles and to value them.

Biogenic nanoparticles may be reused, that can be eco-responsive and perfectly upgraded.

Preferably, the step of desorption may comprise the use of an organic solvent. An organic solvent may be selected from: xylene, benzene, toluene, tetrahydrofuran (THF). Preferably the solvent is a polar solvent in order to improve its evaporation.

Preferably, the solvent is the THF.

This solvent allows preserving organic molecules and biogenic nanoparticles. Advantageously, the THF is a chromatography solvent, that may be used after the method according to the invention in order to characterize the organic molecules.

According to another aspect, the invention concerns the use of organic molecules recovered from a complex matrix obtainable by the method according to the invention for their application in gas separation, waste treatment, biomethane application, plastic recycling, complex matrix recycling, complex matrix purification, complex matrix extraction, civil engineering, plastic manufacture, polymer manufacture, or sensor manufacture.

According to another aspect, the invention concerns a composition for recovery organic molecules from a complex matrix, said composition comprising biogenic nanoparticles and a complex matrix being selected in crude oil, plastic pyrolysis oil, wood pyrolysis oil, bio-oil, algae oil.

According to another aspect, the invention concerns recovered organic molecules from the method according to the invention for use in chemical reaction. For example, as a catalyst or as a component to be transformed. Recovered organic molecules may also be used as a reactant in chemical reaction in several applications such as sensor manufacture in order to increase the sensibility of the sensor.

Another chemical reaction may be $CO_2$ reduction in presence of porphyrins in order to produce methane or other molecules.

According to another aspect, the invention concerns biogenic nanoparticles depleted from organic molecules for use them in recycling step, preferably according to the invention.

EXAMPLES

Preparation, Synthesis of $SiO_2$ Nanoparticles from Waste Plant Material

One of the first steps of the invention is to obtain nanoparticles from waste plant material such as biogenic material. Those nanoparticles are in particular Silicon Oxide $SiO_2$ nanoparticles.

For example, the rice husks contain more than 15% of silicon that grown naturally as amorphous nanoparticles of $SiO_2$ linked by Cellulose, Lignin and other organic molecules.

Rice Husks Treatment: Lixiviation, Burning, and Grinding.

The rice husks have been washed with water to remove dust and dirt from the field, after this rice husks are left in Hydrochloric acid 15% for 24 hours to extract the soluble metals present in the rice husk. This step assures to obtain a maximum in the active sites available.

The rice husks are burned in two steps:
first step: heated to 350° C. for 4 hours/kg of rice husks to burn the organic matter. After this step only Carbon and silicon are presented in the sample,
second step: the temperature is rising to 700° C. to vaporize the carbon and obtain pure silicon.

The aggregate of nanoparticles is separate in single nanoparticles using a ball mill.

Nanoparticles Analysis.

The nanoparticles have been characterized by different techniques focusing to obtain the size and form. By Dynamic Light Scattering (DLS) it is possible to obtain the hydrodynamic diameter of the particles. Scanning Electron Microscopy (SEM) and Atomic Force Microscopy (AFM) permit to confirm the shape, size and structure of the nanoparticles. Nanoparticles dispersed in distillate water at a very low concentration are measured with a calibrated DLS instrument.

The analysis of the size distribution of the nanoparticles shows a wide distribution between 20 nm and 100 nm with a maximum of 40 nm approximately with some aggregate of nanoparticles and single nanoparticles with an average size of approximately 30 nm in height.

The density of the nanoparticles has been measured with a pycnometer using a well-known methodology to measure density of dust or porous media. The pycnometer is filled with nanoparticles to ⅔ of the total volume and then complete with water, with the weight and water density the particles density has been calculated.

For our sample the value obtained is near to the value for amorphous silica (2.196 g/mL).
Density of nanoparticles from biogenic material=2.370 g/mL
Porosity of nanoparticles from biogenic material=76.67% with a pore volume of: Pore Volume=0.44 cm$^3$/g These obtained values allow understanding that nanoparticles of biogenic material have a hollow structure, fulfill of pores.

Functionalization of Nanoparticles of Biogenic Material

In order to variate the surface of the nanoparticles to change the surface activity towards the fluid the nanoparticles were superficially covered with two different molecules:
Carboxymethyl Cellulose (CMC) and Polyethylene Glycol (PEG)
both molecules present a polar group which could interact strongly with the nanoparticles and a nonpolar part of the outsize.

Surface Modification with CMC:

To cover the nanoparticles with a layer of CMC, 1 gr of nanoparticles were dispersed in 100 mL of 2000 ppm solution of CMC in water. The mixture is dry until evaporate all the solvent with agitation at a very low rate (0.1 mL/min). The dry powder is washed with ethanol to remove the excess of CMC.

Surface Modification with PEG:

To cover the nanoparticles with a layer of PEG, 1 gr of nanoparticles were dispersed in 100 mL of 2000 ppm solution of PEG in water. The mixture is dry until evaporate all the solvent with agitation at a very low rate (0.1 mL/min) The dry powder is washed with ethanol to remove the excess of PEG.

Nanofluid Preparation (Preferably for High Viscosity Oil)

Nanofluid is prepared mixing a defined quantity of nanoparticles in the right solvent and concentration.

Recovery of Organic Molecules According to the Invention

Biogenic nanoparticles, $SiO_2$ nanoparticles from waste plant material, prepared according to the examples, were used for the adsorption of valuable organic molecules contained in several oils.

In particular, biogenic nanoparticles were used for the filtration of several complex matrices at room temperature.

The adsorption protocol consists of put the nanoparticles directly in contact with the oils. If the oil is not very viscous, nanoparticles are used as a filter and the oil is passed through them. If the oil is moderately viscous, they are brought into contact by adding a quantity of nanoparticles to a quantity of oil and stirring for 1 to 3 hours at room temperature and then the mixture is filtered on a nanoparticle filter. In the case of highly viscous oils, dispersed nanoparticles in a solvent are added (nanofluid), the mixture is stirred for 1 to 3 hours and they are separated by centrifugation. The oil filtered or put in contact with the nanoparticles is analyzed by GPC ICP MS and GPC UV.

The first experiments show that biogenic nanoparticles allow organic molecules, and in particular organometallic molecules to be adsorbed and thus isolated from the oils.

Subsequently, the nanoparticles impregnated with the adsorbed molecules are dispersed in some organic solvent, such as THF, toluene, xylene, chloroform, dichloromethane, methanol, for 72 hours and a part of the adsorbed material is extracted to be studied and analyzed by GPC ICP MS.

After extraction, the solvent is evaporated and the adsorbed material is recovered.

Pyrolysis Oil

Figure 4A:
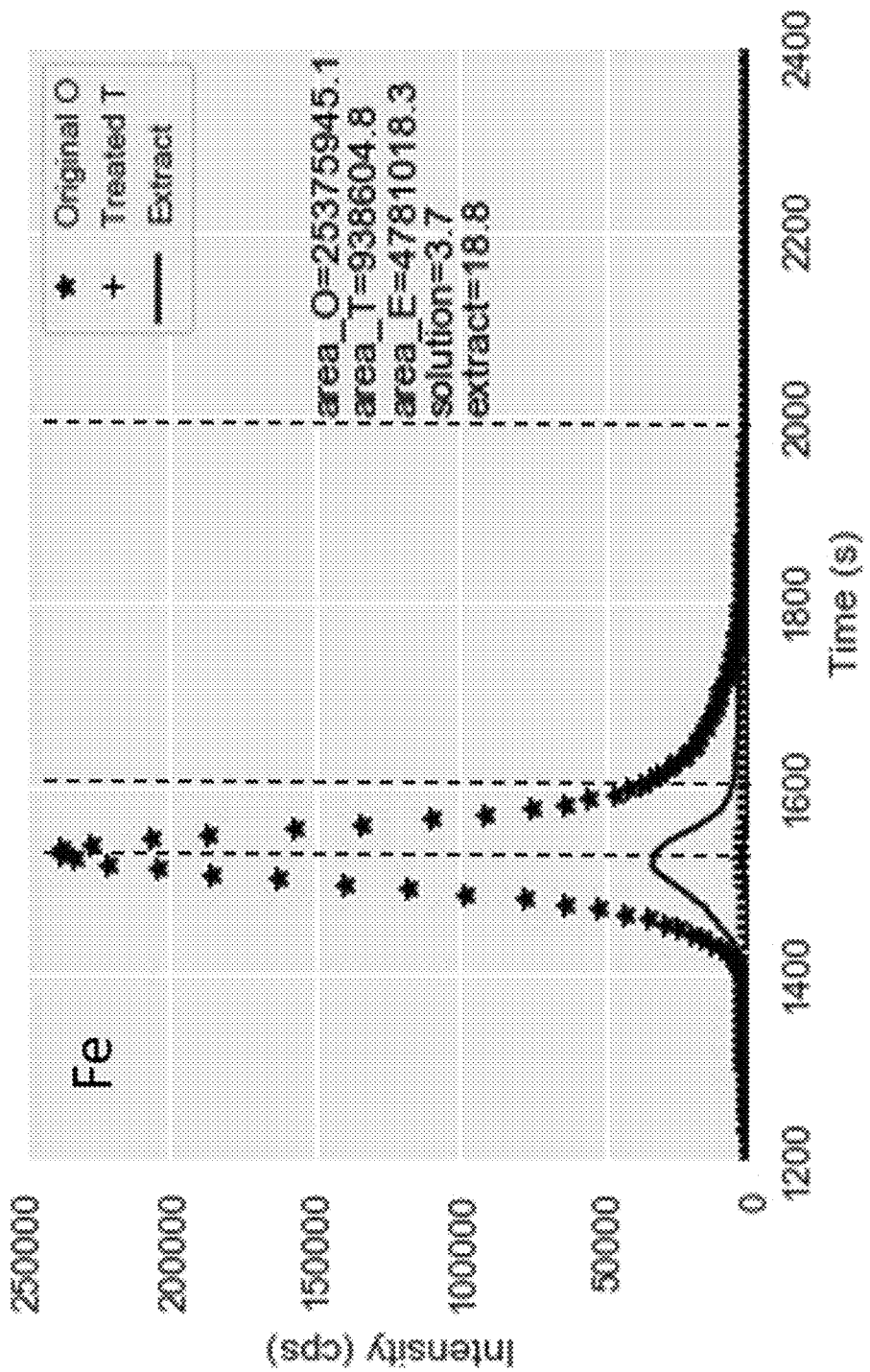
FIG. 4 are an illustration of ICP-MS analyses of iron (FIG. 4A) and UV spectrometry (FIG. 4B) on several samples obtained through an application of the method of the invention on pyrolysis oil.

The FIG. 4A illustrates the iron dosage in the Pyrolysis oil (black stars), the depleted matrix (plus sign) and in a solution obtain after a step of desorption of the organic molecules from the biogenic nanoparticles (black line). These analyses show that almost all iron bearing organic molecules were adsorbed to the biogenic particles.

Figure 4B:
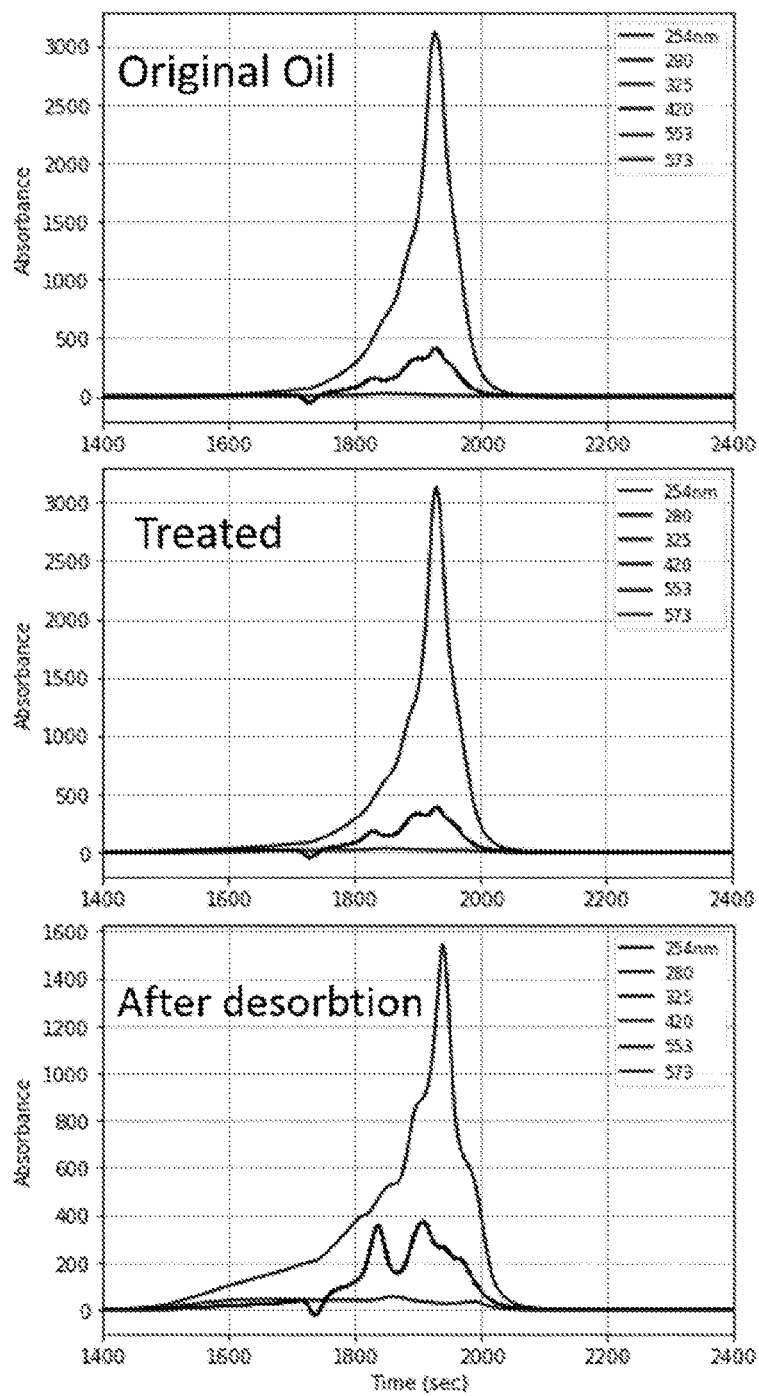

The FIG. 4B illustrates the results of an UV spectroscopy on in the complex matrix (original oil), the depleted matrix (Treated) and in a solution obtain after a step of desorption of the organic molecules from the biogenic nanoparticles.

These analyses show that the complex matrix comprises mainly hydrocarbon structures (254 nm peak) which concentration is not significantly affected by the adsorption step.

Wood Pyrolysis Oil

Figure 5:
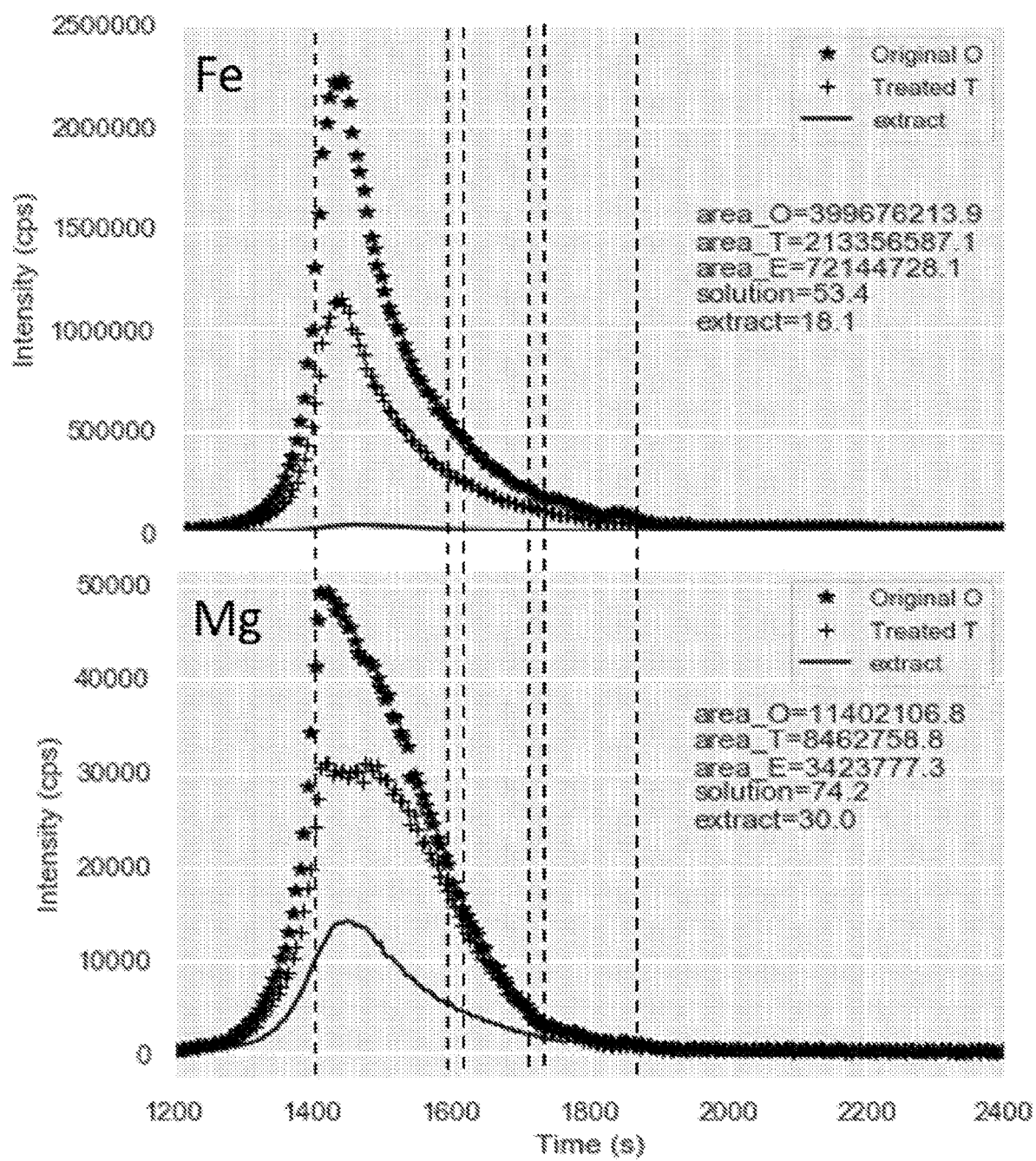
FIG. 5 are an illustration of ICP-MS analyses of iron (FIG. 5 up) and magnesium (FIG. 5 down) on several samples obtained through an application of the method of the invention on wood pyrolysis oil.

The FIG. 5 (up) illustrates the iron dosage in the Wood pyrolysis oil (black stars), the depleted matrix (plus sign) and in a solution obtain after a step of desorption of the organic molecules from the biogenic nanoparticles. These analyses show that almost all iron bearing organic molecules were adsorbed to the biogenic particles.

The FIG. 5 (down), illustrates the magnesium dosage in the Wood pyrolysis oil (black stars), the depleted matrix (plus sign) and in a solution obtain after a step of desorption of the organic molecules from the biogenic nanoparticles. These analyses show that magnesium bearing organic molecules were adsorbed to the biogenic particles and released in a step of desorption of the organic molecules.

Algae Oil

Figure 6:
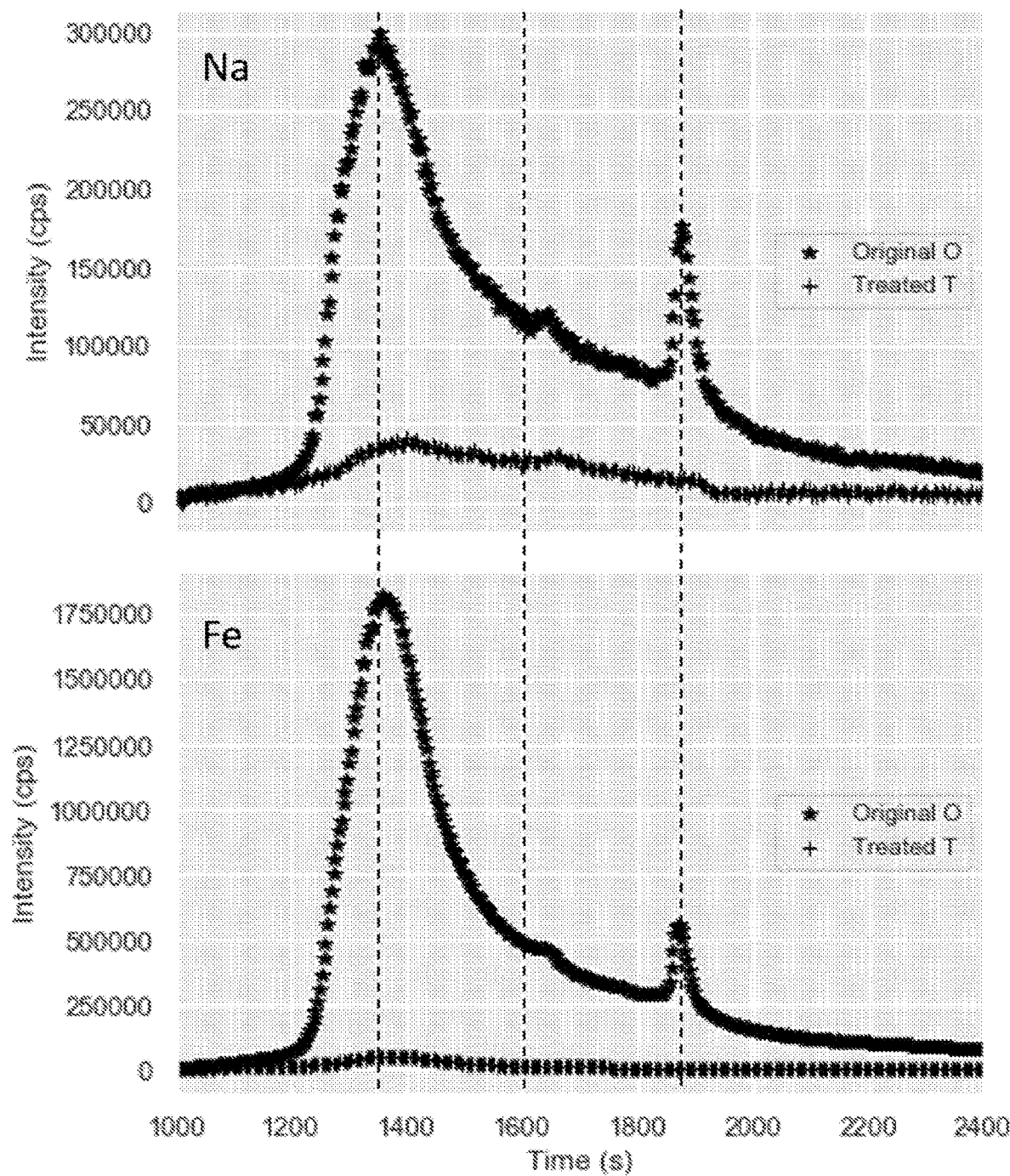
FIG. 6 are an illustration of ICP-MS analyses of sodium (FIG. 6 up) and iron (FIG. 6 down) on several samples obtained through an application of the method of the invention on algae bio-oil.

The FIG. 6 up illustrates the sodium dosage in the algae bio-oil (black stars) and the depleted matrix (plus sign). These analyses show that almost all sodium bearing organic molecules were adsorbed to the biogenic particles. Similarly, the FIG. 6 (down) illustrates the iron dosage in the algae bio-oil (black stars) and the depleted matrix (plus sign). These analyses show that iron bearing organic molecules were adsorbed to the biogenic particles.

Crude Oil

Figure 7:
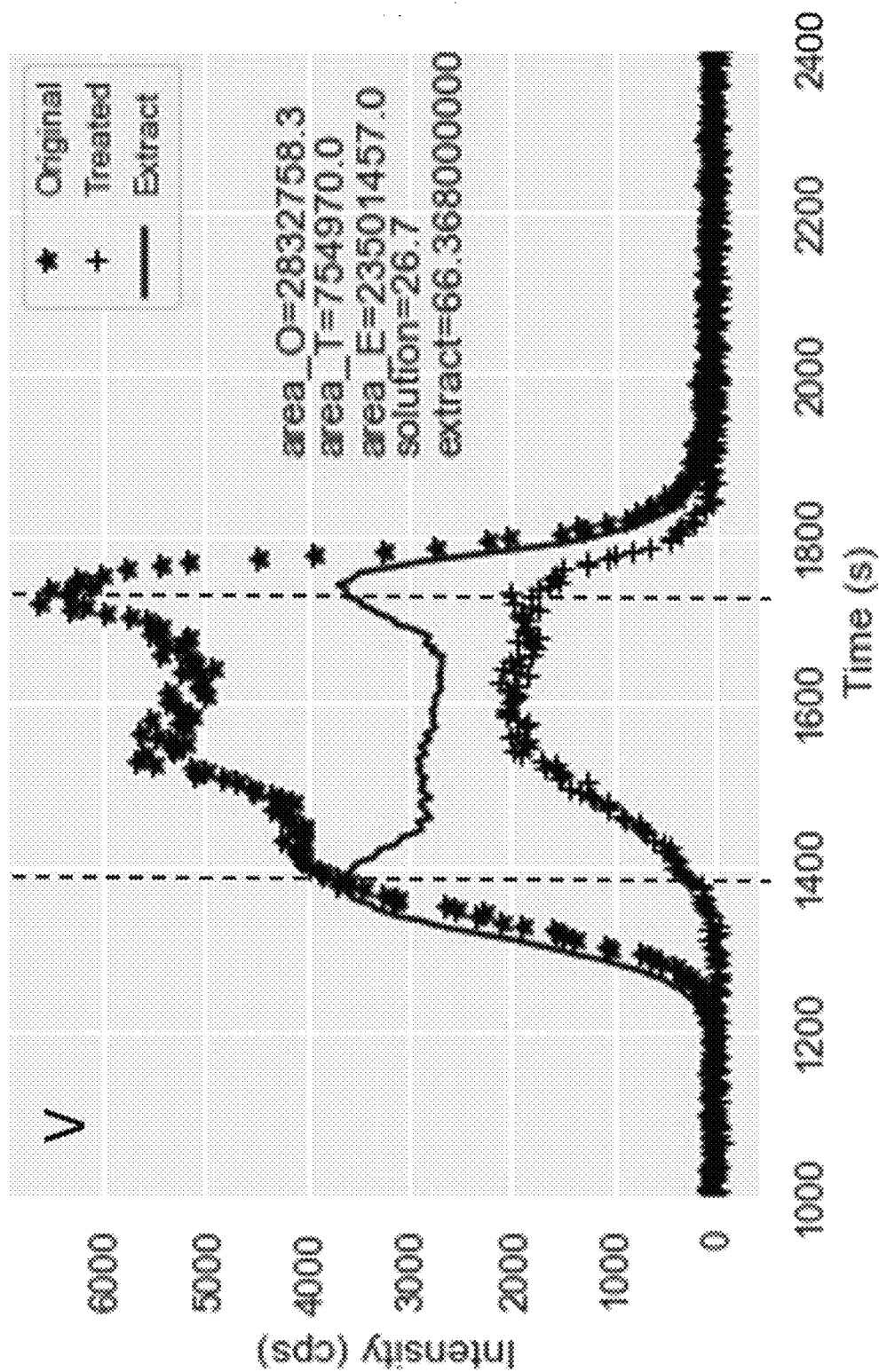
FIG. 7 is an illustration of ICP-MS analyses of vanadium on several samples obtained through an application of the method of the invention on crude oil.

The FIG. 7 illustrates the vanadium dosage in the crude oil (black stars), the depleted matrix (plus sign) and in a solution obtain after a step of desorption of the organic molecules from the biogenic nanoparticles. These analyses show that most of the low and high molecular weight vanadium bearing organic molecules were adsorbed to the biogenic particles and released in a step of desorption of the organic molecules.

Use of Organic Molecules According to the Invention

Enriched biogenic nanoparticles can be used as catalysts in scalable organic reactions.

Indeed, porphyrins adsorbed to the biogenic nanoparticles can be used in oxidation reaction such as epoxidation, sulfoxidation, hydroxylation or carbonylation. They can also be used as photocatalysts in oxidation reactions.

Alternatively, another application is $CO_2$ reduction in presence of porphyrins in order to produce methane or other molecules. The recovery of the porphyrins allows using this molecule in the production of $CH_4$ from $CO_2$. The porphyrins are used as catalyst in the chemical reaction.

The method allows to produce bio-based compounds without expensive and difficult chemical synthesis, and which have low yield and not eco-responsive.

Thanks to the invention, it is possible to recover and recycling molecule (porphyrin, metals, Fr, Ni, Va, asphaltenes) in complex matrix.

The invention claimed is:

1. A method for recovering organic molecules from a complex matrix, said method comprising the steps of:
   Contacting the complex matrix with biogenic nanoparticles, for adsorption of organic molecules therefrom on the biogenic nanoparticles;
   Separating the biogenic nanoparticles enriched with the organic molecules from the complex matrix which has been depleted of the organic molecules; and
   Using the organic molecules that were adsorbed to the biogenic nanoparticles in a chemical process or in a chemical device
wherein the biogenic nanoparticles are mesoporous.

2. Method for recovering organic molecules according to claim 1, wherein the organic molecules are used after a step of desorption from the biogenic nanoparticles.

3. Method for recovering organic molecules according to claim 1, wherein the organic molecules are used being adsorbed to the biogenic nanoparticles.

4. Method for recovering organic molecules according to claim 1, wherein the step of contacting the complex matrix with biogenic nanoparticles comprises at least one of: filtration, spinning, centrifugation, stirring, ultrasound treatment, magnetic contact, microwave treatment, and heating.

5. Method for recovering organic molecules according to claim 1, wherein the step of contacting comprises contacting the complex matrix with a nanofluid, said nanofluid comprising said biogenic nanoparticles and a low polarity solvent, the low polarity solvent comprising one or more of: acetone, kerosene, hexane, xylene, toluene, dimethylbenzene, mesitylene, benzene, and ethylbenzene.

6. Method for recovering organic molecules according to claim 1, wherein the step of separating the biogenic nanoparticles comprises at least one of: filtration, settling, centrifugation, magnetic separation, and vacuum filtration.

7. Method for recovering organic molecules according to claim 1, wherein said organic molecules are selected from the group consisting of: non-metallic organic molecules, organometallic molecules, aggregate of non-metallic organic molecules and/or organometallic molecules, and their salts.

8. Method for recovering organic molecules according to claim 1, wherein the complex matrix is selected from crude oil, plastic oil, wood oil, bio-oil, algae oil.

9. A method of recovering organic molecules from a complex matrix, said method comprising the steps of:
   Contacting the complex matrix with biogenic nanoparticles, for adsorption of organic molecules therefrom on the biogenic nanoparticles;
   Separating the biogenic nanoparticles enriched with the organic molecules from the complex matrix which has been depleted of the organic molecules; and
   Using the organic molecules that were adsorbed to the biogenic nanoparticles in a chemical process or in a chemical device;
wherein the complex matrix is an algae oil.

10. Method for recovering organic molecules according to claim 1, wherein the biogenic nanoparticles are doped, functionalized and/or raw.

11. Method for recovering organic molecules according to claim 1, wherein the method comprises a step of regenerating said biogenic nanoparticles depleted from said organic molecules.

12. Method for recovering organic molecules according to claim 11, wherein the step of contacting the complex matrix with said biogenic nanoparticles comprises the use of depleted biogenic nanoparticles.

13. Method for recovering organic molecules according to claim 1, wherein the step of using the organic molecules is selected from gas separation, waste treatment, biomethane application, plastic recycling, complex matrix recycling, complex matrix purification, complex matrix extraction, civil engineering, plastic manufacture, polymer manufacture, and sensor manufacture.

14. Method for recovering organic molecules according to claim 1, wherein the organic molecules comprise porphyrins.

15. A method for recovering organic molecules from a complex matrix, said method comprising the steps of:
   Contacting the complex matrix with biogenic nanoparticles, for adsorption of organic molecules therefrom on the biogenic nanoparticles:

Separating the biogenic nanoparticles enriched with the organic molecules from the complex matrix which has been depleted of the organic molecules; and Using the organic molecules that were adsorbed to the biogenic nanoparticles in a chemical process or in a chemical device;

wherein the orgnanic molecules comprise porphyrins and the step of using the organic molecules includes a $CO_2$ reduction in presence of porphyrins in order to produce methane or other molecules.

16. Obtaining organic molecules by the method according to the claim 1, and applying the obtained organic molecules in gas separation, waste treatment, biomethane application, plastic recycling, complex matrix recycling, complex matrix purification, complex matrix extraction, civil engineering, plastic manufacture, polymer manufacture, or sensor manufacture.

17. A method comprising recovering organic molecules from the method according to claim 1, and reacting the recovered organic molecules in a chemical reaction.

* * * * *